US007015978B2

(12) United States Patent
Jeffers et al.

(10) Patent No.: US 7,015,978 B2
(45) Date of Patent: Mar. 21, 2006

(54) SYSTEM AND METHOD FOR REAL TIME INSERTION INTO VIDEO WITH OCCLUSION ON AREAS CONTAINING MULTIPLE COLORS

(75) Inventors: James L. Jeffers, Yardley, PA (US); Gregory House, Doylestown, PA (US); Kevin Harney, Brooklyn, NY (US)

(73) Assignee: Princeton Video Image, Inc., Lawrenceville, NJ (US)

( * ) Notice: Subject to any disclaimer, the term of this patent is extended or adjusted under 35 U.S.C. 154(b) by 264 days.

(21) Appl. No.: 09/734,709

(22) Filed: Dec. 13, 2000

(65) Prior Publication Data

US 2002/0027617 A1 Mar. 7, 2002

Related U.S. Application Data

(60) Provisional application No. 60/170,398, filed on Dec. 13, 1999.

(51) Int. Cl.
*H04N 9/74* (2006.01)

(52) U.S. Cl. ............... 348/586; 348/587; 348/589; 348/598

(58) Field of Classification Search ............ 348/586, 348/587, 589, 590, 591, 598, 600; 345/150, 345/640, 592, 424, 582, 606–607; 382/162, 382/169
See application file for complete search history.

(56) References Cited

U.S. PATENT DOCUMENTS 5,264,933 A * 11/1993 Rosser et al. ............... 348/578

| 5,889,578 A | * | 3/1999 | Jamzadeh ............ 355/41 |
| 5,953,076 A | | 9/1999 | Astle et al. |
| 6,011,595 A | * | 1/2000 | Henderson et al. ...... 348/590 |

(Continued)

*Primary Examiner*—Brian Yenke
*Assistant Examiner*—Trang U. Tran
(74) *Attorney, Agent, or Firm*—Sterne Kessler Goldstein & Fox PLLC

(57) ABSTRACT

A system, method and computer program product for real-time insertion of indicia (e.g., an advertisement) into a live (or taped) broadcast. Typically, the invention allow insertion with occlusion onto surfaces such as tennis courts, the wall behind home plate on a baseball field, the grass or turf on a soccer or football stadium, and the like. The occlusion processing described herein can handle multiple colors in the background image during the insertion of the indicia into a video image. The invention can thus adapt to changing light conditions in the video image. The process includes obtaining a video image from a camera. The video image is typically digitized. Next, the pixels within the video image are sampled. A plurality of background colors are then identified for the sampled pixels. An opacity value is then assigned to each pixel in the indicia based on whether the color of a positionally corresponding pixel in the video image is the same color as one of the plurality of background colors. Finally, pixels within the indicia are displayed in the video image if the color of the positionally corresponding pixel in the video image is the same color as one of the background colors and a pixel in the indicia is not displayed in the video image if the positionally corresponding pixel in the video image is not the same color of as one of the background colors.

9 Claims, 6 Drawing Sheets

U.S. PATENT DOCUMENTS

| | | | |
|---|---|---|---|
| 6,043,900 A * | 3/2000 | Feng et al. | 382/169 |
| 6,100,925 A | 8/2000 | Rosser et al. | |
| 6,181,820 B1 * | 1/2001 | Tachikawa et al. | 382/190 |
| 6,288,703 B1 * | 9/2001 | Berman et al. | 345/150 |
| 6,301,382 B1 * | 10/2001 | Smith et al. | 382/162 |
| 6,310,657 B1 * | 10/2001 | Chauvel et al. | 348/569 |
| 6,351,555 B1 * | 2/2002 | Acharya et al. | 382/162 |
| 6,750,919 B1 * | 6/2004 | Rosser | 348/584 |

* cited by examiner

SYSTEM AND METHOD FOR REAL TIME INSERTION INTO VIDEO WITH OCCLUSION ON AREAS CONTAINING MULTIPLE COLORS

CROSS-REFERENCE TO RELATED APPLICATIONS

This application claims priority to provisional U.S. Provisional Patent Application No. 60/170,398, entitled "System and Method of Real Time Insertion into Video with Occlusion on Areas containing Multiple Colors," filed Dec. 13, 1999, the entirety of which is incorporated by reference herein.

BACKGROUND OF THE INVENTION

1. Field of the Invention

This invention relates to the performance of occlusion processing for inserting realistic indicia into video images.

2. Background Art

The present invention represents an improvement over the technology described in U.S. Pat. No. 5,953,076 (which is incorporated by reference in its entirety) to Astle and Das and the other referenced therein.

One of the key elements used to make inserted indicia (inserts) look realistic in motion video systems such as broadcast television, Internet streaming video systems, motion pictures, DVD discs, etc., is to make objects that move in front of the inserts appear to pass over the top of or "occlude" the insert. The majority of existing processes for providing this capability utilize color differencing techniques which are sometimes called chroma-keying. This term generally implies that the system effectively uses a single color or a limited continuous range of color, sampled before and/or during the video production, as a reference color at the desired location of the insert. A difference "mask" is then created by subtracting the pixels existing in the live image at the insert location from the reference color pixel values. Wherever the result of the subtraction is at or near zero, pixels from the insert are included in the resulting image. Wherever the subtraction result has a large magnitude, the pixels in the live image are retained.

The single color range differencing technique described above can work well if the insert location(s) on the live image is indeed within a single color range at the beginning and throughout the video broadcast. However, there are many circumstances where this single color criterion may not be met. For example, the insert could be placed on the playing field in an outdoor sporting event that is held in a stadium or a location surrounded by large structures or buildings. In this case, there is a significant chance that the insert location will have shadows cast on portions of the field by a structure as the sun's position changes throughout the game. If the insert location has areas that are both sunlit and in shadow, a minimum of 2 distinct color ranges are introduced that must be supported by the system. The occlusion processing system using a single color range described above will only be able to provide occlusion on either the sunlit or shadowed area but not both, making the insert look much less realistic. Another example is where the insert location includes a large multi-colored team logo painted in the center of a playing field. If the insert were intended to cover or partially cover this logo then the single color system would fail again, only being able to cover a single color in the logo, and again the resulting insert would look much less realistic.

U.S. Pat. No. 5,953,075 to Astle and Das describes an alternative to a single color differencing scheme for overcoming some of the difficulties discussed above. The technique discussed therein relates to the use of a synthetic reference image that is captured during setup prior to the live video production going to air. While that technique provides for some measure of multiple color handling, it has some drawbacks. For example, although the system is designed to handle global changes in lighting conditions by updating, it fails to handle situations such as a shadow creeping across a field, which only changes part of the occluding region. Furthermore, since the reference image may be highly filtered as described, it may by its nature introduce new artifacts that will be particularly evident in areas of color transition and will, in many cases, provide a non-realistic look to the insert.

In addition, the required use of image warping capability by Astle and Das puts a very significant and potentially high-cost processing burden on the occlusion processing system. Astle and Das describe a method to reduce or eliminate the warping cost which essentially describes a simplified version of their system using single color processing. Also, Astle and Das describe a fairly complex and computationally intensive method of processing and mixing Y, U, and V component values on a per pixel basis to determine the appropriate mask value for a pixel. Briefly, the method involves subtracting each of the Y, U, and V reference image values from the positionally corresponding Y, U, and V live image values and then taking the square root of the sum of the squares of the differences as shown in the following formula:

$$S = (W_y(Y_L - Y_R)^2 + W_a((U_L - U_R)^2 + (V_L - V_R)^2))^{1/2}$$

where w is a weighting factor for the Y (luma) and C (chroma) values.

Not only is the formula complicated and computationally intensive, but the method by which the result is used to distinguish foreground pixels from background pixels (i.e., the pixels that must not be occluded from the pixels that must be occluded) causes an increased number of pixels to receive the wrong foreground/background designation. For example, if two of the color components evaluate to zero, meaning that they match the reference color, but the third has a notable but not a significantly large difference, the result will likely indicate that the pixel is part of the background. However, the single third component differentiation indicated a difference that may have been erroneously suppressed in this compositing calculation.

BRIEF SUMMARY OF THE INVENTION

The present invention provides a system, method and computer program product for real-time insertion of indicia (e.g., an advertisement) into a live (or taped) broadcast. Typically, the invention allow insertion with occlusion onto surfaces such as tennis courts, the wall behind home plate on a baseball field, the grass or turf on a soccer or football stadium, and the like. The occlusion processing described herein can handle multiple colors in the background image during the insertion of the indicia into a video image. The invention can thus adapt to changing light conditions in the video image. The process includes obtaining a video image from a camera. The video image is typically digitized. Next, the pixels within the video image are sampled. A plurality of background colors are then identified for the sampled pixels.

An opacity value is then assigned to each pixel in the indicia based on whether the color of a positionally corresponding pixel in the video image is the same color as one of the plurality of background colors. Finally, pixels within the indicia are displayed in the video image if the color of the positionally corresponding pixel in the video image is the same color as one of the background colors and a pixel in the indicia is not displayed in the video image if the positionally corresponding pixel in the video image is not the same color of as one of the background colors.

In a preferred embodiment, the background colors are identified by first sampling pixels in the video image to obtain a Y, U, and V value for each pixel. Other values (such as RGB, or any color format derivable from RGB) can be sampled and used as described below. Furthermore, in one embodiment, only individual values (e.g., Y) are sampled. Next, a histogram for each of said Y, U, and V values is generated, wherein each histogram represents a total number of occurrences of each of the Y, U, and V values for the sampled pixels. A dominant node from each of the histograms is then selected (each of the dominant nodes identifies a background color). Finally, each of the sampled pixels having Y, U, and V values that fall within the dominant nodes from the sampled pixels are discarded. These steps can then be repeating to identify additional background colors.

As stated above, each pixel in the indicia is assigned an opacity value. This value is generated by accessing a look-up table for each background color. The look-up tables defines opacity values for pixels. In an embodiment, the Y, U, and V values each have a separate look-up table. This can be applied to other values as well (such as RGB, or any color format derivable from RGB). Furthermore, any number of alternative implementation schemes for processing the color components is recognized, which do not require the actual use of a look-up table. For example, passing the component through the upper and lower bound thresholds follows by "AND" operation. However, these envisioned approaches can be implemented through the use of a look-up table as well.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
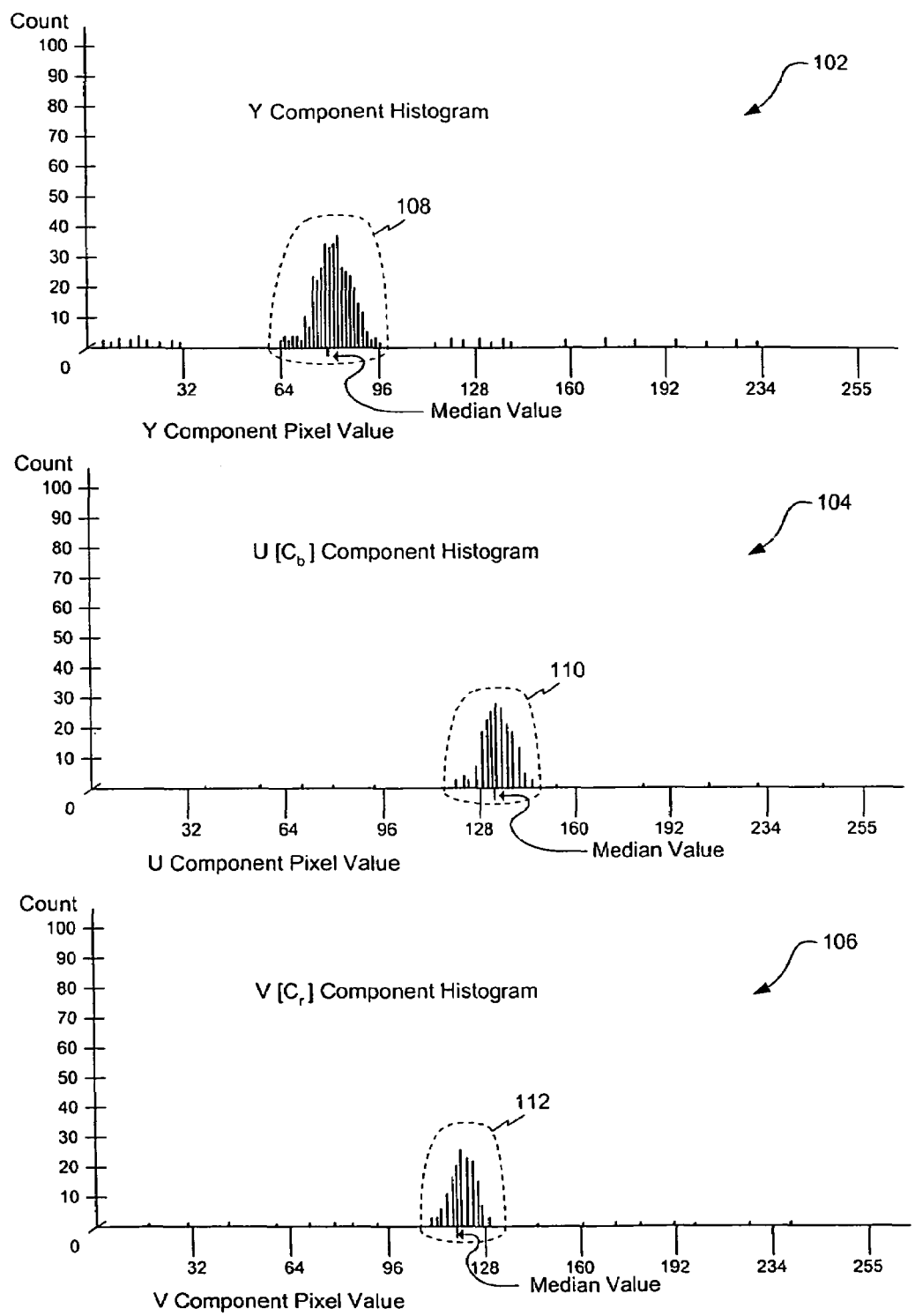
FIG. 1 depicts an example of Y, U, and V component histograms generated for an insert in an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The invention comprises a method for providing the real-time occlusion of an image inserted into a live video production such that the background can contain multiple colors, without the use of a warped reference image, and the cost and errors associated with that method. The method maintains the ability to adapt and adjust to varying lighting conditions, especially, but not limited to, changes that are not spatially uniform, such as, but not limited to, moving shadows, and camera adjustments for each of the colors on the background insertion area. Processing for occlusion opacity mask generation occurs at the field rate of the video processing system (e.g., 59.94 fields per second in NTSC). The occlusion processing technique described herein is repeated on each field upon which the occlusion insert area is visible for optimal effect. The same technique may be performed on fewer or sampled fields or frames, however, though not as effectively.

Figure 5:
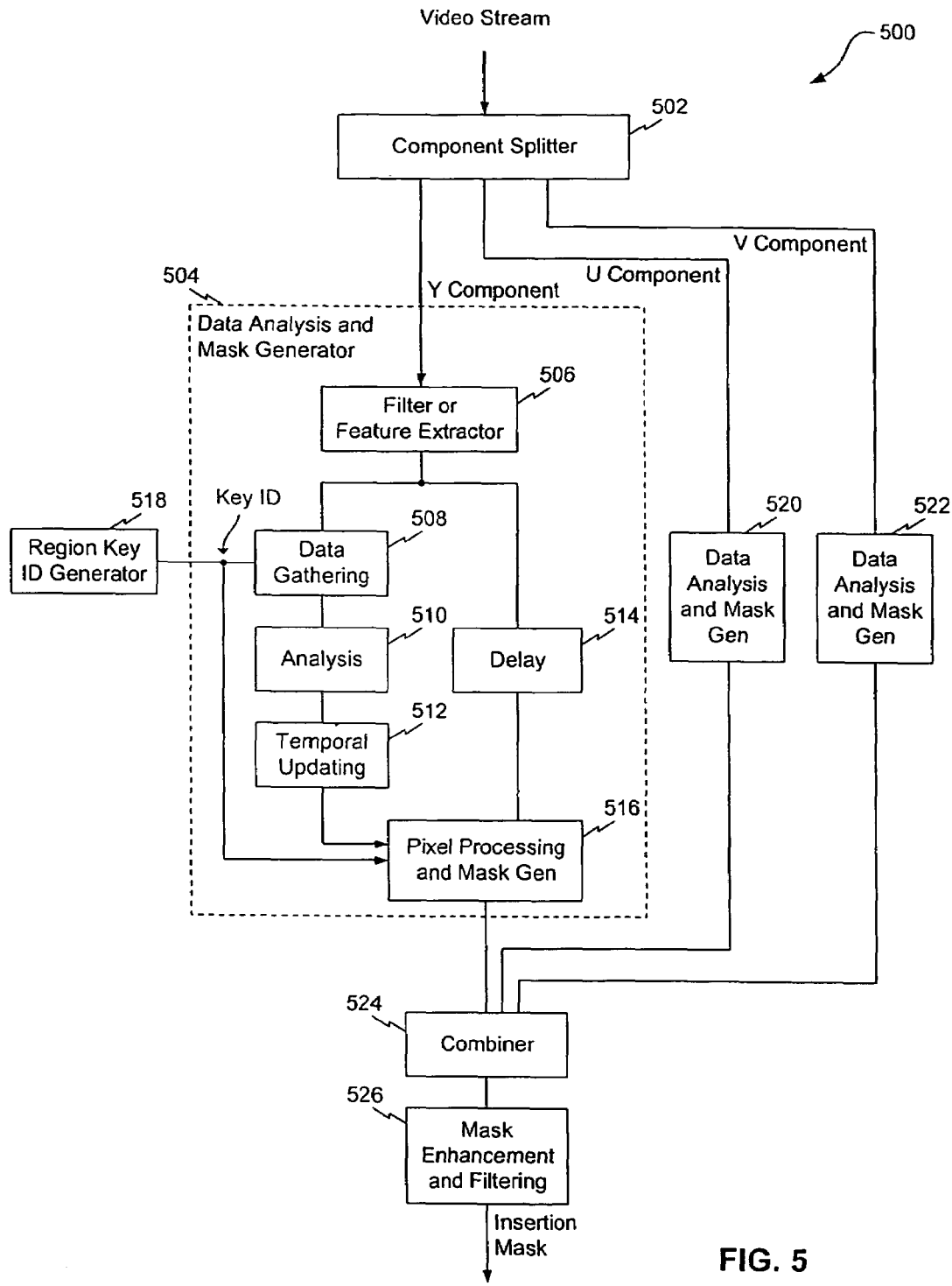
FIG. 5 depicts an indicia insertion system 500 that provides for occlusion processing in accordance with an embodiment of the present invention.

FIG. 5 depicts an indicia insertion system 500 that provides for occlusion processing in accordance with an embodiment of the present invention. The indicia insertion system 500 comprises a component splitter 502, a Y component data analysis and mask generator module 504, a U component data analysis and mask generator module 520, a V component data analysis and mask generator module 522, a region key ID generator 518, a combiner 524, and a mask enhancement and filtering module 526. The indicia insertion system 500 receives a video stream and generates a mask for inserting an indicia into a video image.

The component splitter 502 receives a video stream and splits the stream into component channels. The video stream is typically received from a broadcase camera after digitization. For example, as shown in FIG. 5, the component splitter 502 receives a video stream and splits the stream into a Y component channel, a U component channel and a V component channel. Importantly, the present invention can receive a video stream in other formats (e.g., RGB) and split it into its unique components. Furthermore, in one embodiment, only one of the components (e.g., Y) is used to process the video image to take into account occlusions during the insertion process.

Each component channel is then received by a corresponding data analysis and mask generator which operates to generate an insertion mask for each of the components of the video stream. In particular, the Y component data analysis and mask generator module 504 receives the Y component channel and generates an insertion mask for the Y component based on the values received. Likewise, the U component data analysis and mask generator module 520 receives the U component channel and generates an insertion mask for the U component based on the values received. Finally, the V component data analysis and mask generator module 522 receives the V component channel and generates an insertion mask for the V component based on the values received.

The combiner 524 receives the insertion masks for the Y, U and V components and combines the mask to generate a single insertion mask for inserting the indicia into the video image.

The mask enhancement and filtering module 526 receives the single insertion mask for inserting the indicia into the video image and performs additional enhancement and filtering operations to refine the mask, outputting a final insertion mask.

As seen in FIG. 5, the Y component data analysis and mask generator module 504 is further comprised of several functional components. These components include a filter or feature extractor 506, a data gathering module 508, an analysis module 510, a temporal updating module 512, a delay module 514, and a pixel processing and mask generator module 516. According to the embodiment shown in FIG. 5, the U component data analysis and mask generator module 520 and the V component data analysis and mask generator module 508 each comprise the same functional components as the Y component data analysis and mask generator module 504, except that those modules are adapted to process the U component channel and the V component channel, respectively. The details of the U component data analysis and mask generator 520 and the V component data analysis and mask generator 522 are not shown in FIG. 5 for the sake of brevity.

As shown in FIG. 5, the filter or feature extractor 506 receives the Y component data and performs a filtering or feature extraction operation. The filtered Y component data is then provided to the data gathering module 508, which samples and accumulates the filtered Y component data. The results from the data gathering module 508 are passed to the analysis module 510, which analyzes the accumulated filtered Y component data to identify dominant features within the sampled data, such as a dominant color range. The results of the analysis phase are then passed to the temporal updating module 512 which performs temporal filtering to remove errors from the sampled data, such as errors due to input noise.

A feedback loop (not shown) between the temporal updating module 512 and the data gathering module 508 permits further iterations of data gathering, analysis, and filtering to identify additional dominant features within the sampled data, such as additional dominant color ranges. Alternatively, the feed back loop also can extend from the Analysis module 510 to the data gathering module 508. Additionally, because the present invention can distinguish between one or more dominant features and non-dominant features, it can effectively distinguish between foreground features and background features within a video image, even where the background features comprise more than one dominant feature (e.g., the background comprises more than one dominant color).

The pixel processing and mask generator module 516 receives the results from the temporal updating module 512 as well as the filtered video image, which has been delayed by the delay module 514. The pixel processing and mask generator module 516 uses this information to generate an insertion mask for the Y component that consists of an opacity value for each pixel of the indicia to be displayed.

As shown in FIG. 5, the region key ID generator 518 generates a region key ID that is input to both the data gathering module 508 and the mask enhancement and filtering module 512. The region key ID serves to identify the location within the video image where data gathering and pixel processing should be applied.

As discussed above, embodiments of the present invention include two interrelated processing phases: (1) a Data Gathering and Analysis Phase; and (2) a Pixel Processing and Mask Generation Phase. A third, usually independent phase, (3) Mask Enhancement and Filtering, may also be used to further improve the quality of the occlusion information.

The Data Gathering and Analysis phase processes and analyzes the image data, which may be live or played back from a recording medium or system such as, but not limited to, analogue or digital beta tape or hard drive type storage device, to determine the number of colors and the "range" of each of the color subcomponents (Y, U, and V) in a region of the image, which can include the insert area. In related embodiments, other attributes of the image such as texture or local variance may also be used as the basis for processing (FIG. 5, module 506).

There are two Data Gathering modes: (1) Grab Reference mode; and (2) Updating mode. In the Grab Reference mode, the current or live image pixel data is analyzed without attempting to distinguish foreground objects (i.e., objects not to be occluded) from the background insert area (i.e., the area which may be occluded by an inserted image). In general, the system enters the Grab Reference mode upon operator command, on system initialization, or on some event such as, but not limited to, start of an image sequence. The purpose of this mode is to perform an initial analysis of the insert area colors to get a starting point (also known as a reference or reference histograms) for the colors or other set of values that will be monitored and on which the insert will be placed during the live production when it is on air or the sequence of images that are being dealt with in a post production mode.

Once the colors or other values have been analyzed and the initial information for the background insert area has been determined, the processing automatically enters the Updating mode. In the updating mode, the system analyzes and monitors the insert area and uses a variety of techniques to isolate background pixels from the foreground pixels in a process known as culling, which is described more fully herein. With the foreground pixels eliminated by the culling process, a more detailed analysis of the characteristics of the background color, Y, U, and V components or other attributes of the pixels, such as, but not limited to, local variance, may be performed without the worry of the foreground information skewing the statistical results.

Data Gathering Phase

In either mode, the Data Gathering phase starts with the generation of sensor locations at which pixel data will be sampled. In an embodiment, the pixel data is in CCIR601 YUV 4:2:2 packed format. Other formats such as HDTV modes or compression modes such as, but not limited to MPEG2, can also be accommodated. In the case of CCIR601 format, two pixels can be sampled with each 32-bit atomic read of data. Other formats with a varying number of pixels per sensor are also possible.

A Front End recognition system (not shown) provides insert location information that is easily transformed into a 4 point Quadrilateral pixel location of the insert area on screen. U.S. Pat. No. 6,100,925 to Rosser et al. and U.S. Pat. No. 5,264,933 to Rosser et al., both of which are incorporated by reference in their entirety herein, describe exemplary recognitions systems. An optimized quadrilateral fill algorithm is employed to uniformly distribute sensors throughout the insert area. Due to the significantly reduced computational requirements of the Pixel Processing phase, subsequently described herein, as compared to the compute-intensive method utilized by Astle and Das, much more processing time is available to position the sensors, and read and analyze the pixel data, resulting in a much larger sampling of pixel data. In a preferred embodiment, typical sampling is about 400 sensors or 800 pixels and, depending on the level of analysis required, up to 1600 sensors have been used in practice. This provides for much greater statistical accuracy in the analysis than the preferred embodiment described by Astle and Das, which, in turn provides for greater foreground versus background pixel discrimination.

The pixel values for each video component (Y, U and V) are gathered into statistical histograms each with 256 "bins". The bins are used to accumulate the number of occurrences of the video component value across all sensors. For example, if in the sensor area, the Y component of ten pixels are found that to have a value of 80, then bin #80 in the histogram will have a value of 10 after reading all the sensor data. The data for all the pixels at the sensor locations are collected into histograms for each component. Furthermore, when in Updating Mode, the pixel data can be separated and collected into two sets of histograms representing the statistics for the foreground and background data independently. This information can subsequently be used to refine the occlusion by allowing the system to avoid displaying inserts on areas detected as containing foreground colors. Alternate schemes are envisioned where a single bin can be associated with multiple component values, and number of values associated with each bin can be different.

Analysis Phase

Once the data is gathered, the Analysis phase is entered. The Analysis phase consists of determining the most dominant conglomeration of data in each video component's histogram and determining the range or pixel value extent this data conglomeration encompasses. In a preferred embodiment, the most dominant conglomeration of pixel data is determined using either a statistical median or mode calculation depending on the circumstances of the background color. Other mathematical methods of determining the most dominant conglomeration are possible, the choice of which may depend upon the circumstances encountered in the video. Finding the statistical median is the typical default method and has been used successfully for a variety of circumstances.

FIG. 1 depicts an example of Y, U, and V component histograms for an insert area dominated by a single color. Each of the histograms in FIG. 1 show the total accumulation, or count, of the number of pixels exhibiting a particular component value ranging from 0 to 255. Y component histogram 102 shows a conglomeration of Y pixel data occurring between the Y component values of 64 and 96. This data conglomeration is identified as the main node 108, with a median Y component value of 80. U component histogram 104 shows a data conglomeration of U pixel data occurring between the U component values 120 and 146. This data conglomeration is identified as the main node 110, with a median U value of 133. V component histogram 106 shows a data conglomeration of V pixel data occurring between the V component values 108 and 130 with a median V value of 119.

After determining the location of the dominant node in the histogram, the extent of the data is determined by searching in each direction away from the median or mode value until the data "trails off" to a minimal value (e.g., zero). There are several means available to specifically determine the end point depending upon the circumstances, but a suitable method is to use a threshold determined by the percentage of total pixels gathered into the histogram and to stop the searching algorithm when a bin is at or below that level. Another method is to determine at what point the entire data conglomeration exceeds a percentage of the total pixels. Occasional statistical anomalies that may occur utilizing the first thresholding method, such as an isolated bin falling below the calculated threshold in the midst of bins above the threshold, can be eliminated by ensuring that two or more contiguous bins are below the threshold.

By using this analysis method on each of the three pixel component histograms, the color ranges of a particular single visual color to the casual observer can be determined.

To support the detection of multiple colors, multiple histogram color component sets are used and an iterative process is executed to load the histogram sets with the appropriate data. Once the analysis of the most dominant color is completed, the resulting data from that analysis can be used to "cull" sensor data that indicate pixels belonging to the dominant node. Pixels that are not part of the dominant node are placed in the current iteration's associated histogram, and pixels that are part of the dominant node are discarded. The histogram analysis is redone with the original dominant node eliminated and therefore the second most dominant color will be extracted. This process can be repeated for a specific number of colors or until no more statistically significant colors are detected as dictated by the circumstances. Once the termination point of the color determination process has been reached, the remaining unassigned pixel values at the sensor locations are considered foreground colors.

Although this analysis has been described with respect to color, the same mathematical methods, algorithms, and techniques, can obviously be extended to encompass other pixel values. These include, but are not limited to, texture or local pixel variance or pixel distance from an object, edge or known region of an image or stadium or dynamic range enhancement or filtering (FIG. 5, module 506).

Temporal Updating Strategy

Since sensors are not generally positioned such that each and every pixel in the occlusion insert area is utilized in the data analysis, video system noise and the statistical errors associated with it may cause the occlusion processing and analysis to generate non-optimal data for one or more consecutive fields. However, it has been observed that over relatively short periods of time (on the order of 4 to 12 fields), the noise is spatially dispersed such that pixels in the same location tend to have a consistent color value when averaged over time if no other parameters (e.g., pan, tilt, zoom, shading) are changing. Also, noteworthy is the fact that the color range about the central (i.e. median) value of a color in a video image are unlikely to change significantly over even longer periods of time (e.g., 15 to 30 fields), even if the central color is changing due to such events as camera shading or environmental lighting changes.

The present system utilizes these factors to suppress inadvertent reactions to the noise level inherent in video systems. By performing temporal filtering of the results of the Analysis phase, the occlusion processing dampers field to field errors that occur due to input noise. Furthermore, the system employs separate filtering parameters to be employed for the range versus the central color value of a detected histogram node. Allowing the central value to be more responsive to actual changes in lighting and color due to environmental or camera changes, while continuing to provide a longer term temporal filtering of the range, reduces artifacts such as occlusion mask flickering due to video noise.

There are a number of situations where the measured color may prove to be an unreliable indicator of the unoccluded color. These include when the occlusion region is greater than 50% occluded, when the camera is zoomed into a small portion of the occlusion region, or a portion of the occlusion region is visible at the edge of the screen. It is advisable to discard color measurements that do not meet basic sanity checks. Possible measures include, but are not limited to, color hue relative to result of the previous field, number of sensors contributing to the color, and camera zoom level relative to the size of the occlusion region. A scheme is also envisioned where the updating rate is reduced as the measure approaches the sanity check cutoff.

It is helpful for the temporal updating strategy to incorporate additional sources of lighting-related information. For example, the iris of the camera can be instrumented with a sensor which can monitor changes in color appearance. Similarly, an image processing technique extracted over part or all of the video image can detect color appearance changes. Changes in these appearance measures can be used to update the position of the measured color nodes. This is particularly useful for updating the occlusion color when the occlusion region is off-screen. In a similar fashion, the updating of multiple color nodes can be linked together.

Pixel Processing and Occlusion Opacity Mask Generation

Once the temporal filtering is completed, Pixel Processing for generating the occlusion mask may occur. The Pixel Processing uses a set of simple Lookup Tables (LUT). For each color that is to be unoccluded, a set of 256-entry LUTs, one LUT each color component (e.g. Y, U, and V), is used. The LUT indices correspond to the pixel component value of the video image data. The output of each LUT is an opacity mask value for the insert where 0 equals no opacity or fully transparent and 255 equals full opacity for the insert. Values in between 0 and 255 provide a corresponding mixing of the insert with the video image data.

In the case of multiple regions, the key id (FIG. 5, module 518) can be used to determine which of multiple sets of LUT should be applied to a single pixel value. The above discussion can also be applied to other values as well (such as RGB, or any color format derivable from RGB). Furthermore, any number of alternative implementation schemes for processing the color components is recognized, which do not require the actual use of a look-up table. For example, passing the component through upper and lower bound thresholds followed by "AND" operation. However, these envisioned approaches can be implemented through the use of a look-up table as well.

The output mask value for each possible component pixel value is programmed into the LUTs for each video field. The values programmed are based on the calculated range for each color for which occlusion processing is desired. In a typical example, the LUT is programmed with values of 255 where the pixel values are within the calculated range for that component, and 0 where the pixel values are not within the calculated range. As a refinement, in areas close to the transition between pixel values within the range, and pixel values outside the range, the LUT is programmed with values that provide for a mixing of the video and insert images. This allows for an improved look for pixels that may be part of the insert background that may not have been sampled (e.g., due to system noise) during the Data Gathering and Analysis phases.

So, when a video image pixel is input to the LUT processing, it generates three potential opacity mask values, one from each component's LUT. In order to create a single occlusion opacity mask value for a particular color, a processing element must determine a final mask value. In the preferred embodiment, this processing element can be as simple as a selector for selecting the smallest, or minimum mask value for the pixel. In this way, any single component that indicates that a pixel is not part of the background will allow the foreground pixel to be properly displayed as a result. Therefore, unlike the computationally intensive selection algorithm described by Astle and Das, that also may provide false results on some instances, this method of selection can be implemented with very little computing resources.

Figure 2:
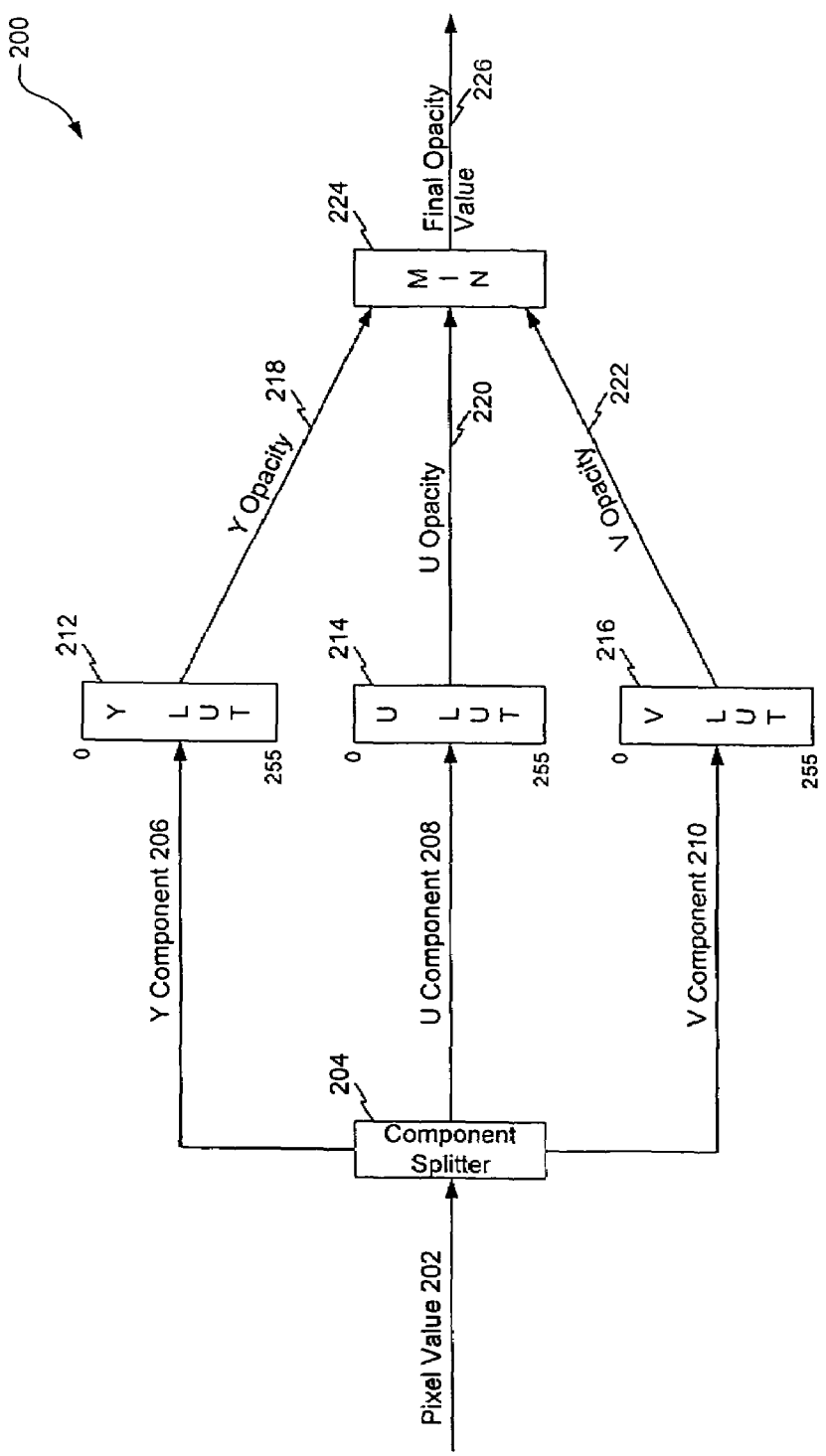
FIG. 2 depicts an example pixel processing system for a video image with a single background color in accordance with an embodiment of the present invention.

FIG. 2 depicts a pixel processing system 200 for a video image with a single background color in accordance with the present invention. The pixel processing system 200 includes a component splitter 204, a Y lookup table 212, a U lookup table 214, a V lookup table 216, and a minimum selector block 224.

As shown in FIG. 2, a pixel value 202 is input to the component splitter 204, which splits the pixel value 202 into its video sub-components. More specifically, the splitter 204 splits the pixel value 202 into a Y component 206, a U component 208, and a V component 210. The Y component is used as an index to address the Y lookup table 212 and select a corresponding Y opacity value 218. Similarly, the U component 208 is used as an index to address the U lookup table 214 and select a corresponding U opacity value 220. Finally, the V component 210 is used as an index to address the V lookup table 216 and select a corresponding V opacity value 222. The Y opacity value 218, the U opacity value 220 and the V opacity value 222 are each input to the minimum selector block 224 which selects the smallest of the Y opacity value 218, the U opacity value 220 and the V opacity value 222 and outputs the selected opacity value as the final opacity value 226.

Multiple colors can be processed by simply replicating the LUTs and selection processing elements for each additional color and then providing one or more selection processing elements to select between the multiple color outputs. In the preferred embodiment, the final selection element can be as simple as a selector that selects the largest or the maximum value of the multiple color inputs. Again, the preferred selection method requires minimal computing resources. Alternative means for combining component values are contemplated (e.g., the middle value).

Figure 3:
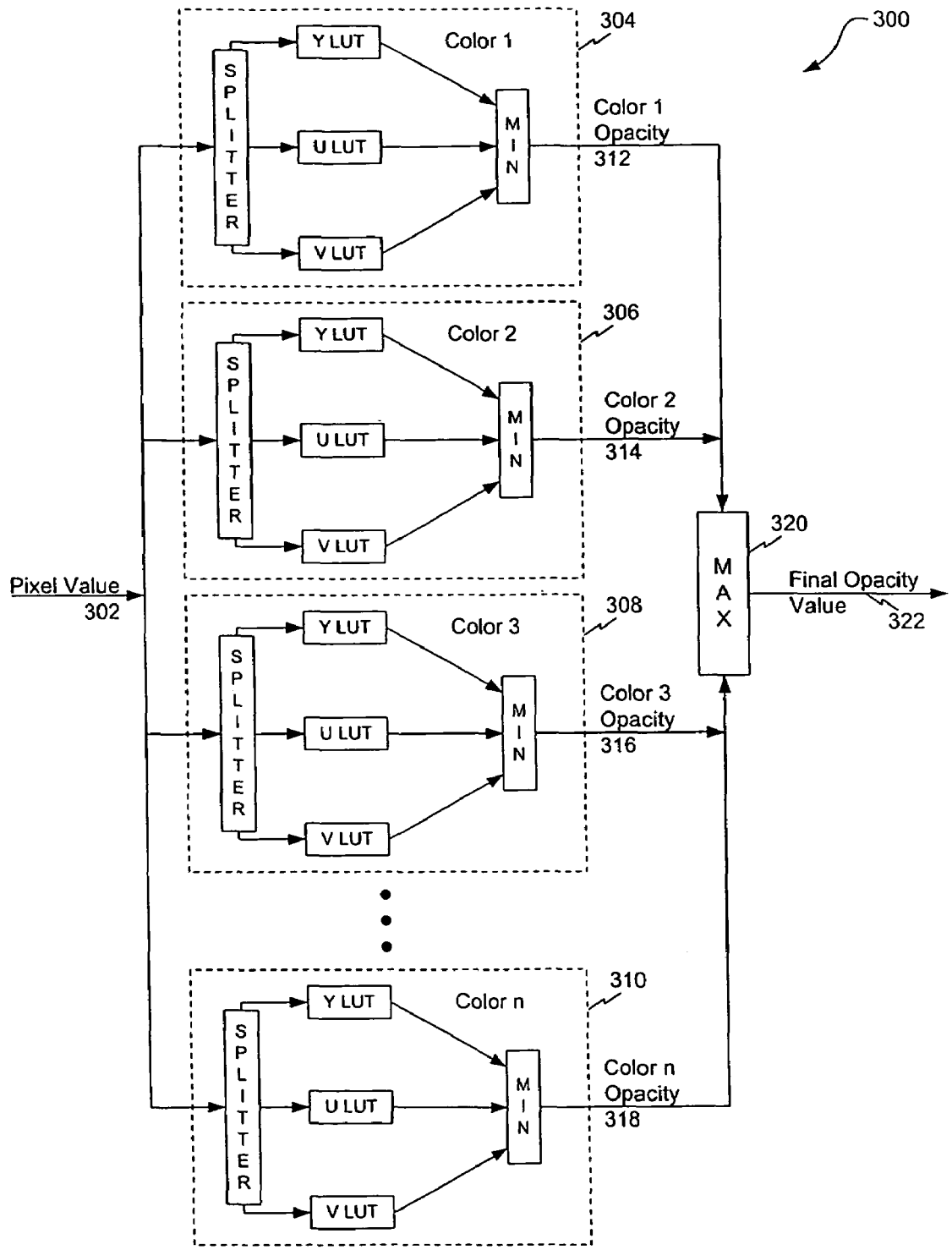
FIG. 3 depicts an example pixel processing system 300 for a video image with multiple background colors according to an embodiment of the present invention.

FIG. 3 depicts an example pixel processing system 300 for a video image with multiple background colors according to an embodiment of the present invention. The pixel processing system 300 comprises a plurality of single color pixel processing systems, such as the pixel processing system 200 described in reference to FIG. 2 above, wherein a single color pixel processing system is used for each color from color 1 through color n, and a maximum selector block 320.

As shown in FIG. 3, a pixel value 302 is input to the pixel processing system 300 and is received by the single color pixel processing systems 304, 306, 308 and 310, corresponding to colors 1 through n. Each of the single color pixel processing systems outputs an opacity value for a particular color. For example, the color 1 pixel processing system 304 outputs a color 1 opacity value 312, the color 2 pixel processing system 306 outputs a color 2 opacity value 314, the color 3 pixel processing system 308 outputs a color 3 opacity value 316, and the color n pixel processing system 310 outputs a color n opacity value 318. The color 1 opacity value 312, the color 2 opacity value 314, the color 3 opacity value 316, and the color n opacity value 318 are each input to the maximum selector block 320 which selects the largest of the values and outputs the value as the final opacity value 322. In the case of multiple regions, the key id (FIG. 5, module 518) can be used to determine which of the multiple sets of LUTs should be applied to a single pixel value. It is also contemplated that one region may have a single color, but another may have multiple colors.

As an additional enhancement for backgrounds whose colors includes areas in shadow, applying lower opacity values to the LUTs in the area containing the shadows provides for a more natural look to the video image when combined with the inserted image. LUTs values on the order of 25% to 50% of the typical value used in areas without shadow provide a realistic look in the preferred embodiment.

Also note that LUTs can be reduced in size to cover the maximum reasonable range for an occlusion color and provide a starting LUT offset. A reasonable low end solution would be 32 entries, allowing an 8 to 1 increase in the number of supported colors for a typical implementation. In that way, the memory needs of the LUTs can be reduced to allow even more cost effective solutions.

As discussed in regard to the Analysis phase, above, with respect to color, the same mathematical methods, algorithms, and techniques can obviously be extended to encompass other types of pixel values. These include, but are not limited to, texture or local pixel variance or pixel distance from an object, edge or known region of an image or stadium or dynamic range enhancement or filtering. Furthermore, any number of alternative implementation schemes for processing the color components is recognized, which do not require the actual use of a look-up table. For example, passing the component through upper and lower bound thresholds followed by "AND" operation. However, these envisioned approaches can be implemented through the use of a look-up table.

Mask Enhancement and Filtering

Once the Mask Generation is completed, the resulting occlusion opacity mask may be enhanced by several means. For example, a spatial filtering algorithm may be applied to smooth areas of transition in the mask and to eliminate "shot" noise where a few mask pixels may be affected by the system noise. It has been observed that such filtering provides a more pleasing and realistic integrated look to the insert eliminating a harsh transition between the insert and the original video image.

Additionally, an enhancement method has been devised to improve the look of the occlusion opacity mask subsequent to the mask filtering. Various video artifacts may arise due to the circumstances of the event in which the video is being captured or due to the video signal. One such artifact may occur if the camera is using peaking circuitry. Another artifact that may occur is the highlighting of areas of foreground from overhead electric lighting or sunlight such that the foreground object's color begins to match the desired occlusion insert color when it otherwise would be easily extinguishable by the occlusion process described earlier in this document. For example, this might occur when a baseball umpire wearing a dark navy blue shirt crosses in front of a medium blue insert area. Wrinkles in the umpire's shirt can cause the reflection of light to brighten those wrinkled areas such that they appear close to medium blue.

A method has been devised to detect and selectively enhance or suppress occlusion mask data that have these characteristics. These characteristics show themselves on areas where the occlusion processing has generated opaque pixels and non-opaque pixels that are spatially close to each other (within about 7 pixels). This characteristic will likely appear where the boundaries of foreground objects are in front of the occlusion insert area or where there is a "spotty mix" of foreground colors and colors that are close to the occlusion insert area colors (e.g., the highlights generated by the wrinkled shirt above). The enhancement processing identifies those pixels that are in these areas and allows the mask value to be transformed into a desired result depending on the circumstances. For instance, in an area in which a peaking circuit causes the foreground object to have a "halo effect" around it, utilizing a gain function on the mask pixels in the halo region can reduce the halo. In the area where the wrinkles cause the foreground pixels to be identified as pixels on or near the occlusion insert area, the pixel mask values can be suppressed (i.e., forced to zero or full transparency).

In order to detect these pixels, the spatially filtered occlusion opacity mask values are compared to the prefiltered values using a simple comparator processing element. If the two values are equal, the value remains unchanged. If the two values are different, due to the nature of spatial filtering elements, this indicates that this pixel is from an area that contains pixels that are not the same color. In this case, the filtered mask value is passed to a LUT element that may alter the filtered mask value to achieve the desired result depending on the filtered mask value. For example, if the desired filtered mask value is below a certain opacity level, an embodiment may suppress that value. This situation could indicate that this value is from an area that is surrounded by mostly transparent mask values (i.e., the mask would most likely only be below a certain opacity level if the surrounding mask values are at or close to zero due to typical spatial filtering techniques). If trying to reduce peaking halo, then the LUT may be possibly programmed with a sigmoid or linear gain function to allow more opacity weight to the insert in these areas. Other mathematical transform functions could be programmed into this Mask Enhancement processing element to achieve other desired visual effects on these detected pixels.

Finally, to again provide a more realistic integrated appearance of the insert, the result of the Mask Enhancement may be spatially filtered again before being applied to the insert image.

Figure 4:
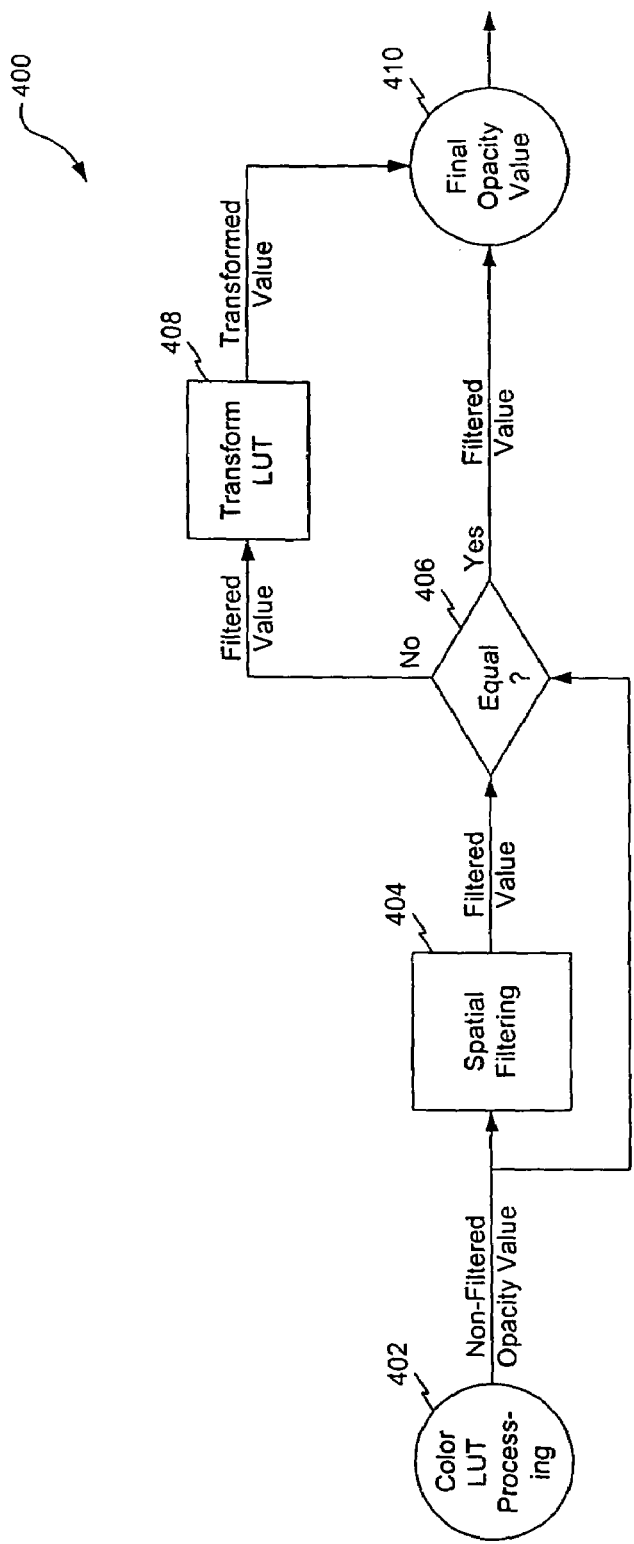
FIG. 4 depicts an example mask enhancement system in accordance with an embodiment of the present invention.

FIG. 4 depicts a Mask Enhancement processing system 400 in accordance with an embodiment of the present invention. Mask Enhancement processing system 400 comprises a spatial filtering module 404, a decision module 406, and a transform LUT module 408. The spatial filtering module 404 receives a nonfiltered opacity value for a pixel from a color LUT processing module 402. The output of the color LUT processing module 402 corresponds to the output of the combiner 524, discussed in reference to FIG. 5, above. The spatial filtering module 404 spatially filters the non-filtered opacity value to generate a spatially filtered value. The decision module 406 receives both the non-filtered opacity value and the filtered values and compares them. If the values are equal then the filtered value is determined to be the final opacity value 410. If the values are not equal then the filtered value is output to a transform LUT 408 which applies an appropriate transform to the filtered value depending on the desired application type, as discussed above. The transform LUT 408 then outputs a transform value which is designated the final opacity value 410.

Example Computer Implementation

Figure 6:
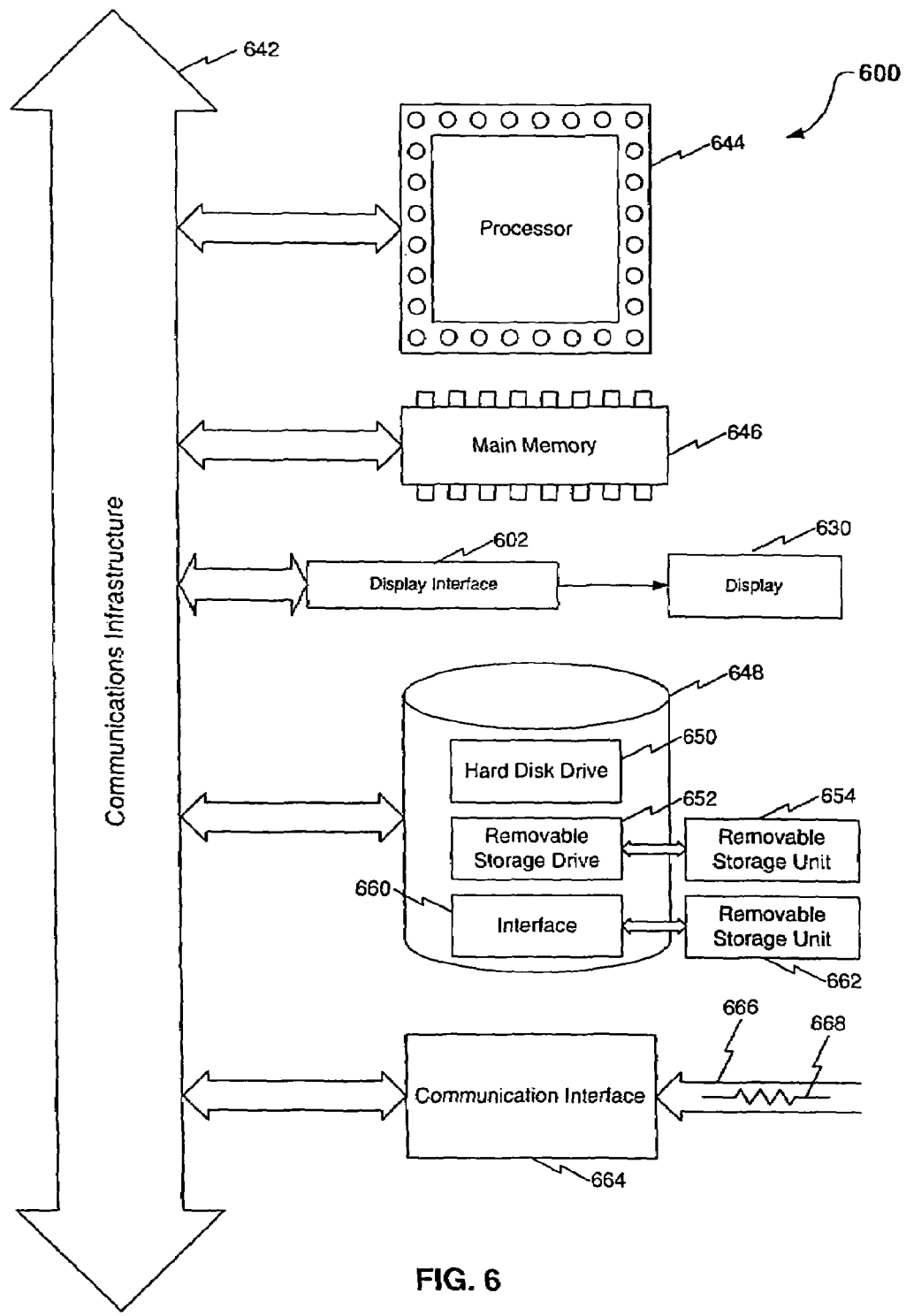
FIG. 6 depicts an exemplary environment.

The present invention (i.e., live video insertion system) may be implemented using hardware, software or a combination thereof and may be implemented in one or more computer systems or other processing systems. In fact, an example of a computer system 600 is shown in FIG. 6. The computer system 600 represents any single or multi-processor computer. In conjunction, single-threaded and multi-threaded applications can be used. Unified or distributed memory systems can be used. Computer system 600, or portions thereof, may be used to implement the present invention. For example, the video insertion system 100 of the present invention may comprise software running on a computer system such as computer system 600. A camera and other broadcast equipment would be connected to system 600.

Computer system 600 includes one or more processors, such as processor 644. One or more processors 644 can execute software implementing the routines described above. Each processor 644 is connected to a communication infrastructure 642 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 600 can include a display interface 602 that forwards graphics, text, and other data from the communication infrastructure 642 (or from a frame buffer not shown) for display on the display unit 630.

Computer system 600 also includes a main memory 646, preferably random access memory (RAM), and can also include a secondary memory 648. The secondary memory 648 can include, for example, a hard disk drive 650 and/or a removable storage drive 652, representing a floppy disk drive, a magnetic tape drive, an optical disk drive, etc. The removable storage drive 652 reads from and/or writes to a removable storage unit 654 in a well known manner. Removable storage unit 654 represents a floppy disk, magnetic tape, optical disk, etc., which is read by and written to by removable storage drive 652. As will be appreciated, the removable storage unit 654 includes a computer usable storage medium having stored therein computer software and/or data.

In alternative embodiments, secondary memory 648 may include other similar means for allowing computer programs or other instructions to be loaded into computer system 600. Such means can include, for example, a removable storage unit 662 and an interface 660. Examples can include a program cartridge and cartridge interface (such as that found in video game console devices), a removable memory chip (such as an EPROM, or PROM) and associated socket, and other removable storage units 662 and interfaces 660 which allow software and data to be transferred from the removable storage unit 662 to computer system 600.

Computer system 600 can also include a communications interface 664. Communications interface 664 allows software and data to be transferred between computer system 600 and external devices via communications path 666. Examples of communications interface 664 can include a modem, a network interface (such as Ethernet card), a communications port, interfaces described above, etc. Software and data transferred via communications interface 664 are in the form of signals which can be electronic, electro-magnetic, optical or other signals capable of being received by communications interface 664, via communications path 666. Note that communications interface 664 provides a means by which computer system 600 can interface to a network such as the Internet.

The present invention can be implemented using software running (that is, executing) in an environment similar to that described above with respect to FIGS. 1–5. In this document, the term "computer program product" is used to generally refer to removable storage unit 654, a hard disk installed in hard disk drive 650, or a carrier wave carrying software over a communication path 666 (wireless link or cable) to communication interface 664. A computer useable medium can include magnetic media, optical media, or other recordable media, or media that transmits a carrier wave or other signal. These computer program products are means for providing software to computer system 600.

Computer programs (also called computer control logic) are stored in main memory 646 and/or secondary memory 648. Computer programs can also be received via communications interface 664. Such computer programs, when executed, enable the computer system 600 to perform the features of the present invention as discussed herein. In particular, the computer programs, when executed, enable the processor 644 to perform features of the present invention. Accordingly, such computer programs represent controllers of the computer system 600.

The present invention can be implemented as control logic in software, firmware, hardware or any combination thereof. In an embodiment where the invention is implemented using software, the software may be stored in a computer program product and loaded into computer system 600 using removable storage drive 652, hard disk drive 650, or interface 660. Alternatively, the computer program product may be downloaded to computer system 600 over communications path 666. The control logic (software), when executed by the one or more processors 644, causes the processor(s) 644 to perform functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of occlusion processing for inserting an indicia into a video image, comprising:
    sampling pixels in the video image;
    identifying a background color for said sampled pixels, said background color comprising first, second and third background color components;

generating first, second and third lookup tables corresponding to each of said first, second and third background color components, each lookup table mapping an input pixel color component value to an opacity value;

applying first, second and third input pixel color component values associated with an input pixel from the video image to said first, second and third lookup tables, respectively, to obtain corresponding first, second and third opacity values; and assigning an opacity mask value to a pixel in the indicia that positionally corresponds to said input pixel from the video image based on the first, second and third opacity values.

2. The method of claim 1, wherein said identifying includes:
   (a) generating a histogram for each of first, second and third color component values assocated with each of said sampled pixels; and
   (b) selecting a dominant node from each of said histograms, wherein said dominant nodes identify a background color.

3. The method of claim 1, wherein said first, second and third background color components are Y, U and V background color components, respectively.

4. The method of claim 1, wherein said first, second and third background color components are R, G and B background color components, respectively.

5. The method of claim 1, further comprising identifying additional background colors.

6. The method of claim 1, wherein said sampling comprises sampling pixels within a predetermined region within the video image.

7. The occlusion processing method of claim 6, wherein said predetermined region within the video image is an insert location for inserting the indicia in the video image.

8. The method of claim 1, wherein said first, second and third opacity values each have a range from transparent to opaque.

9. A method of occlusion processing for inserting an indicia into a video image, comprising:

obtaining a video image from a camera;

sampling pixels in said video image;

identifying a background colors for said sampled pixels, said background color comprising first, second, and third background color components;

generating first, second and third lookup tables corresponding to each of said first, second and third background color components, each lookup table mapping an input pixel color component value to an opacity value;

applying first, second and third input pixel color component values associated with an input pixel from the video image to said first, second and third lookup tables, respectively, to obtain corresponding first, second and third opacity values;

assigning an opacity mask value to a pixel in the indicia that positionally corresponds to said input pixel from the video image based on the first, second and third opacity values; and displaying said video image having said pixel in the indicia inserted therein, wherein said pixel in the indicia is displayed based on said opacity mask value.

* * * * *